United States Patent
Lee et al.

(10) Patent No.: US 9,400,600 B2
(45) Date of Patent: Jul. 26, 2016

(54) METHOD, APPARATUS, AND GRAPHICAL USER INTERFACE FOR PROVIDING VISUAL EFFECTS ON A TOUCHSCREEN DISPLAY

(71) Applicant: SAMSUNG ELECTRONICS CO., LTD., Suwon-si (KR)

(72) Inventors: Shinjun Lee, Yongin-si (KR); Youngri Kim, Suwon-si (KR); Amir Dror, Tel Aviv (IL); Ofir Engolz, Kfar-Saba (IL); Ilhwan Kim, Seoul (KR); Sangok Cha, Daegu (KR); Kyungsoo Hong, Netanya (IL); Sanghyup Lee, Suwon-si (KR); Jaehoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 13/709,941

(22) Filed: Dec. 10, 2012

(65) Prior Publication Data
US 2013/0314341 A1  Nov. 28, 2013

Related U.S. Application Data

(60) Provisional application No. 61/576,497, filed on Dec. 16, 2011.

(30) Foreign Application Priority Data

Feb. 10, 2012 (KR) .................... 10-2012-0014004

(51) Int. Cl.
*G06F 3/041* (2006.01)
*G06F 3/0488* (2013.01)
(Continued)

(52) U.S. Cl.
CPC .............. *G06F 3/0488* (2013.01); *G06F 3/016* (2013.01); *G06F 3/0481* (2013.01); *G06F 3/0483* (2013.01); *G06F 3/04883* (2013.01); *G06F 2203/04808* (2013.01)

(58) Field of Classification Search
CPC ................... G06F 3/041–3/047; G06F 3/048; G06F 3/0484–3/04847; G06F 3/0488; G06F 3/0483; G06F 3/0481; G06F 3/04883; G06F 3/16; G06F 2203/04808
USPC ................................. 345/173–178
See application file for complete search history.

(56) References Cited

U.S. PATENT DOCUMENTS

| 5,596,694 A * | 1/1997 | Capps .................. G06F 3/0481 345/473 |
| 7,648,415 B2 * | 1/2010 | Izuno et al. .................... 463/31 |

(Continued)

FOREIGN PATENT DOCUMENTS

| EP | 2 172 837 A2 | 4/2010 |
| EP | 2 241 963 A1 | 10/2010 |

(Continued)

OTHER PUBLICATIONS

International Search Report (PCT/ISA/210), dated Apr. 12, 2013, issued by the International Searching Authority in counterpart International Patent Application No. PCT/KR2012/011035.

(Continued)

*Primary Examiner* — Andrew Sasinowski
*Assistant Examiner* — Brent D Castiaux
(74) *Attorney, Agent, or Firm* — Sughrue Mion, PLLC

(57) ABSTRACT

A graphical user interface, method and apparatus for providing visual effects on a touchscreen display, including: displaying a first screen; detecting a multi-point touch on the first screen; detecting a first touch event based on the multi-point touch; turning the first screen into a garbage object in response to the first touch event; and removing the garbage object by moving the garbage object to a trash bin icon.

25 Claims, 15 Drawing Sheets

(51) Int. Cl.
*G06F 3/01* (2006.01)
*G06F 3/0481* (2013.01)
*G06F 3/0483* (2013.01)

(56) References Cited

U.S. PATENT DOCUMENTS

| | | | |
|---|---|---|---|
| 2008/0309632 A1* | 12/2008 | Westerman | G06F 3/038 345/173 |
| 2009/0093277 A1* | 4/2009 | Lee | H04M 1/274525 455/566 |
| 2009/0102805 A1 | 4/2009 | Meijer et al. | |
| 2009/0251432 A1 | 10/2009 | Wang et al. | |
| 2010/0093399 A1* | 4/2010 | Kim | H04M 1/0202 455/566 |
| 2011/0080427 A1* | 4/2011 | Oda et al. | 345/634 |
| 2011/0191719 A1* | 8/2011 | Hinckley | G06F 3/048 715/835 |
| 2011/0209104 A1* | 8/2011 | Hinckley | G06F 3/0416 715/863 |
| 2011/0256848 A1* | 10/2011 | Bok et al. | 455/411 |

FOREIGN PATENT DOCUMENTS

| | | | |
|---|---|---|---|
| KR | 10-2011-0116383 A | | 10/2011 |
| KR | 102011011638 | * | 10/2011 |
| KR | 102011011638 A | * | 10/2011 |

OTHER PUBLICATIONS

Communication dated Jun. 2, 2015 issued by the European Patent Office in counterpart Application No. 12858466.1.

* cited by examiner

FIG. 2
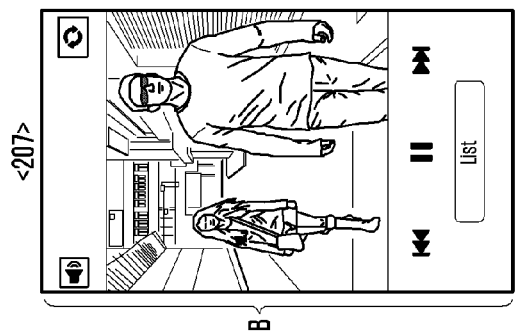
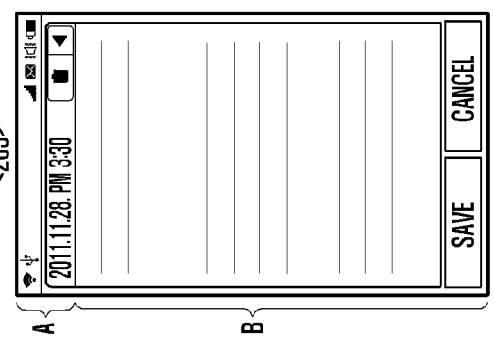 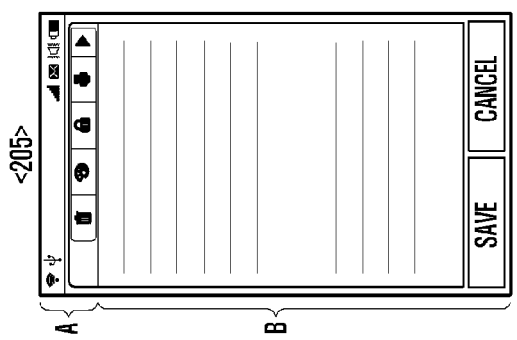
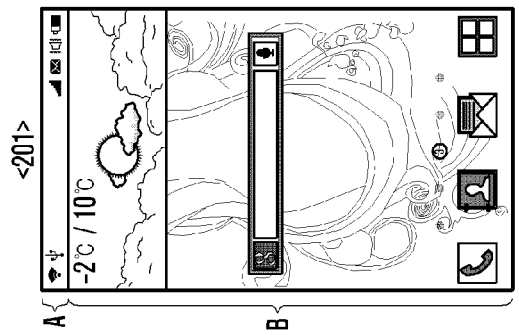

FIG. 15
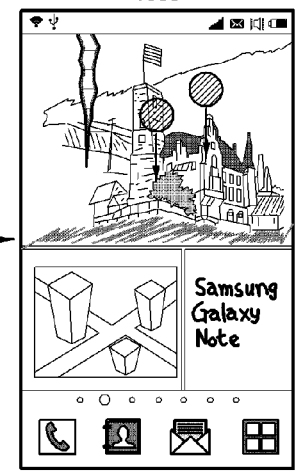
<1503>
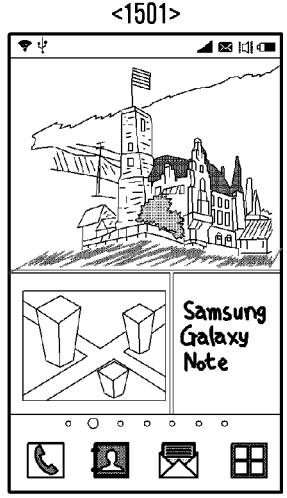
<1501>
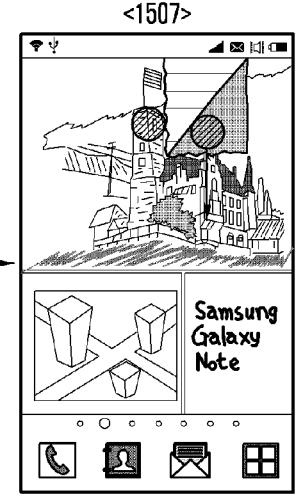
<1507>
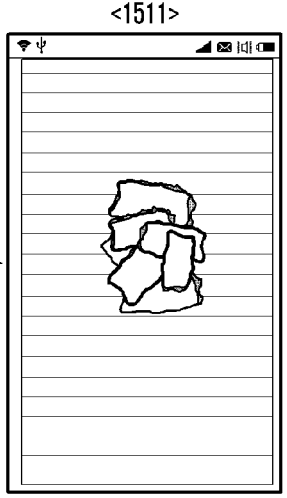
<1511>
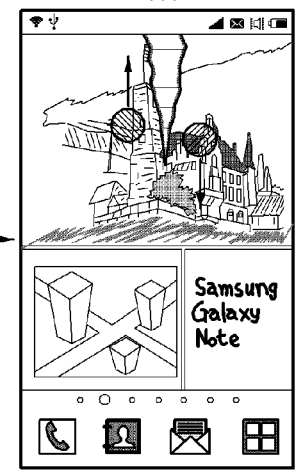
<1509>

METHOD, APPARATUS, AND GRAPHICAL USER INTERFACE FOR PROVIDING VISUAL EFFECTS ON A TOUCHSCREEN DISPLAY

CROSS-REFERENCE TO RELATED APPLICATIONS

This application claims the benefit under 35 U.S.C. §119(e) of a U.S. Provisional Patent Application filed on Dec. 16, 2011 in the U.S. Patent and Trademark Office and assigned Ser. No. 61/576,497, and under 35 U.S.C. §119(a) of a Korean patent application filed on Feb. 10, 2012 in the Korean Intellectual Property Office and assigned Serial No. 10-2012-0014004, each of which are hereby incorporated by reference in their entireties.

BACKGROUND

1. Field

This application relates to a display supporting touch based input and a user function execution method for the same and, more particularly, to a method and apparatus that enable a touchscreen display to produce visual effects like crumpling paper and smoothing out crumpled paper in response to user events.

2. Description of the Related Art

With advances in digital technology, there have been developed various types of touchscreen devices that enable users to communicate and process personal information, such as mobile communication terminals, personal digital assistants, electronic notebooks, smartphones, and touchscreen and tablet computers.

A touchscreen device may be an advanced mobile communication terminal which may support various functions related to voice calls, SMS and MMS messages, video calls, scheduling, photographs, electronic mail, broadcast reception, Internet access, music playback, social networking services (SNS), messengers, dictionaries, games, etc.

In such a touchscreen device, functions for memo writing, message composition, document writing, and photograph editing are frequently used. The user may perform a task using one of such functions, and may cancel the task or delete an object produced by the task utilizing the "end" (or "delete") button or a displayed icon (such as the trash bin icon).

SUMMARY

According to aspects of exemplary embodiments, there is a provided a method enabling a touchscreen display to produce a user experience indicative of the appearance, behavior, sound, and/or feel of physical paper in response to a touch event, as well as a touchscreen display and a graphical user interface providing the aforementioned user experience in response to one or more touch inputs from a user.

According to aspects of exemplary embodiments, there is provided a method enabling a touchscreen display to display a screen which transitions in a manner indicative of a piece of paper being crumpled, torn, and/or folded, and the crumpled paper smoothing out to restore the screen in response to touch events, as well as a display apparatus and graphical user interface supporting such a method.

According to another aspect of exemplary embodiments there is provided a method that enables a touchscreen display to unlock the screen through animation of a lock screen being crumpled according to a touch event, and a display apparatus and graphical user interface supporting the method.

According to another aspect of exemplary embodiments there is provided a method that enables a touchscreen display to produce an animation of an execution screen of an application being crumpled or folded into a garbage object according to a multi-touch event, an animation of the garbage object with a crumpled or folded execution screen being smoothed out according to a multi-touch event, and an animation of deleting the garbage object with a crumpled or folded execution screen according to a single-touch event, as well as a display apparatus and graphical user interface supporting the method.

According to another aspect of exemplary embodiments there is provided a method that enables a touchscreen display to realize an optimal environment for producing realistic visual effects with an analog flavor as well as a touchscreen display and graphical user interface supporting the method. Thereby, user convenience can be enhanced and usability and competitiveness of the touchscreen display can be increased.

According to aspects of another exemplary embodiment, there is provided a method for providing visual effects on a touchscreen display, including: displaying a first screen; detecting a multi-point touch on the first screen; detecting a first touch event based on the multi-point touch; turning, upon detection of the first touch event, the first screen into a garbage object; and removing the garbage object by moving the garbage object to a trash bin icon.

According to aspects of another exemplary embodiment, there is provided a method for providing visual effects on a touchscreen display, including: displaying a lock screen; detecting a first touch event based on a multi-point touch on the lock screen; turning, upon detection of the first touch event, the lock screen into a garbage object; detecting a second touch event based on a single-point touch on the garbage object; and unlocking the screen by moving the garbage object in a preset direction upon detection of the second touch event.

According to aspects of another exemplary embodiment, there is provided a method for providing visual effects on a touchscreen display, including: displaying a first screen; detecting a first touch event on the first screen; turning, upon detection of the first touch event, the first screen into a garbage object; detecting a second touch event on the garbage object; and removing the garbage object by moving the garbage object upon detection of the second touch event.

According to aspects of another exemplary embodiment, there is provided a method for providing visual effects on a touchscreen display, including: displaying a user interface screen containing a virtual keypad; detecting a touch event on the user interface screen; displaying, upon detection of a first touch event based on a single-point touch on the keypad of the user interface screen, information corresponding to the first touch event; and making, upon detection of a second touch event based on a multi-point touch on the user interface screen, a screen transition from the user interface screen to another screen.

According to aspects of another exemplary embodiment, there is provided a method for providing visual effects on a touchscreen display, including: displaying a user interface screen having an input region and a display region; detecting a touch event on the user interface screen; displaying, upon detection of a first touch event based on a single-point touch on the input region of the user interface screen, information corresponding to the first touch event on the display region; and making, upon detection of a second touch event based on a multi-point touch on one of the input region and display region of the user interface screen, a screen transition from the user interface screen to another screen.

According to aspects of another exemplary embodiment, there is provided a method for providing visual effects on a touchscreen display, including: displaying a first screen; detecting a first touch event based on a multi-point touch on the first screen; turning, upon detection of the first touch event, the first screen into a garbage object; detecting a second touch event based on a single-point touch on the garbage object; moving, upon detection of the second touch event, the garbage object and displaying a second screen; detecting a third touch event based on a multi-point touch on the garbage object; and recovering, upon detection of the third touch event, the first screen from the garbage object.

According to aspects of another exemplary embodiment, there is provided a computer readable storage medium storing a program that is executable by a processor and implements the above method.

According to aspects of another exemplary embodiment, there is provided a display apparatus including: a touchscreen display detecting a first touch event based on a multi-point touch and a second touch event based on a single-point touch, and displaying visual effects varied according to the touch events; a storage unit storing setting information specifying visual effects with an analog flavor according to touch events; and a control unit controlling a process of turning a first screen into a garbage object according to the setting information upon detection of a first touch event based on a multi-point touch on the first screen, and moving the garbage object upon detection of a second touch event based on a single-point touch on the garbage object to make a screen transition to a second screen.

According to aspects of another exemplary embodiment, there is provided a computer readable storage medium storing program instructions configured to implement a function for turning a first screen into a garbage object upon detection of a first touch event based on a multi-point touch on the first screen, and for moving the garbage object upon detection of a second touch event based on a single-point touch on the garbage object to make a screen transition to a second screen.

Hereinabove, the features of the exemplary embodiments are described in a relatively broad perspective to help those skilled in the art understand the exemplary embodiments. Other features of exemplary embodiments will be more apparent from the following detailed description.

BRIEF DESCRIPTION OF THE DRAWINGS

The features of exemplary embodiments will be more apparent from the following detailed description in conjunction with the accompanying drawings, in which:

FIG. 2 is screen representations illustrating user interactions to produce a user experience indicative of the appearance, behavior, sound, and/or feel of physical paper on a touchscreen display according to exemplary embodiments;

FIG. 15 is screen representations illustrating user interactions to produce visual effects on a touchscreen display according to exemplary embodiments.

DETAILED DESCRIPTION OF EXEMPLARY EMBODIMENTS

Figure 1:
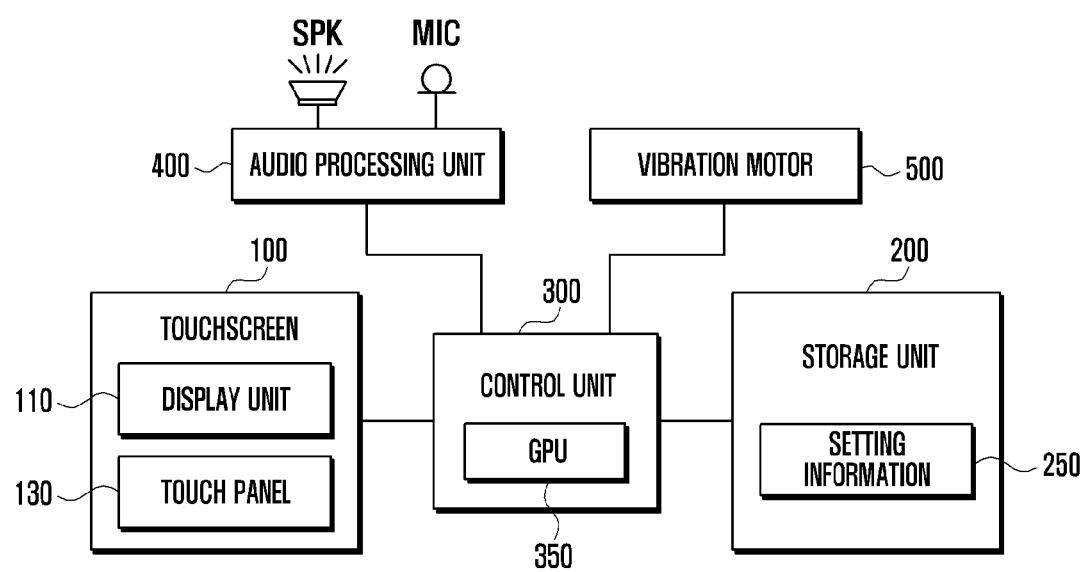
FIG. 1 is a block diagram of a touchscreen display apparatus according to exemplary embodiments.

Hereinafter, exemplary embodiments are described in detail with reference to the accompanying drawings. The same reference symbols are used throughout the drawings to refer to the same or like parts. Detailed descriptions of well-known functions and structures incorporated herein may be omitted to avoid obscuring the subject matter of exemplary embodiments.

Exemplary embodiments relate to a method and apparatus for providing visual effects in a touchscreen display. In one embodiment, a screen transition or cancellation or deletion (cancellation or deletion may be collectively referred to as "deletion") of an input or edited item on a screen is represented by a visual effect indicative of the appearance, behavior, sound, and/or feel of a sheet of paper that is crumpled into a garbage object through animation in response to a touch event. In addition, restoration of the screen associated with the garbage object may be represented may be represented by smoothing out the crumpled garbage object in response to a user input event; alternatively, cancellation or deletion of the task or activity associated with the screen may be represented by moving the crumpled garbage object to the trash bin icon in response to a user input event.

According to exemplary embodiments, the current screen may be turned into a garbage object in response to a touch event. The garbage object represents a task that is associated with the current screen and is ready to be deleted or cancelled. When the garbage object is moved to the trash bin icon or removed from the screen, the task or activity associated with the current screen may be cancelled or deleted and a screen transition may occur. The trash bin icon may represent deletion of an item or object. When a garbage object is moved to the trash bin icon, a task or activity performed though a screen associated with the garbage object is cancelled or removed. The trash bin icon may take the form of an image or text, and may be displayed or not displayed alternately according to the type of application being executed.

In one embodiment, when the touchscreen display is locked with a lock screen, a touch event on the lock screen may cause the lock screen to be crumpled into a garbage object and another touch event on the garbage object associated with the lock screen may unlock the screen.

According to exemplary embodiments, touch events correspond to touch gestures made by the user, and touch gestures may be single-touch gestures or multi-touch gestures. Multi-touch gestures may involve two or more fingers of one hand or both hands. Pinch ( ), spread ( ), rotate ( ) and press & drag (*↦ ) are examples of multi-touch gestures. Drag, sweep, drag-and-drop, tap, double tap, and flick are examples of single-touch gestures. Touch events may be entered by various means including fingers of the user and/or pointing devices such as a stylus.

In one exemplary embodiment, when a multi-touch event detected on a displayed screen corresponds to a touch and move gesture like pinch, the touched screen may be turned into a garbage object of a given shape. Thereafter, when a single-touch event detected on the garbage object corresponds to a touch and move gesture, the garbage object may be moved to the trash bin icon and the task or activity associated with the current screen is cancelled or deleted. When a multi-touch event detected on the garbage object corresponds to a touch and move gesture like spread, the garbage object may be restored back to the previously displayed screen.

Next, a description is given of the configuration and operation of a touchscreen display according to exemplary embodiments with reference to the drawings. However, the configuration and operation thereof are not limited to or by the following description, and various changes and modifications are possible on the basis of the following description.

FIG. 1 is a block diagram of a touchscreen display apparatus according to exemplary embodiments.

Referring to FIG. 1, the touchscreen display apparatus includes a touchscreen 100, a storage unit 200, an audio processing unit 400, a vibration motor 500, and a control unit 300.

The touchscreen display apparatus of FIG. 1 may, for example, be realized as a mobile terminal which may further include a digital broadcast receiving module to receive mobile broadcasts based on digital multimedia broadcasting (DMB) or digital video broadcasting (DVB), a camera module to capture still or moving images of a target object, a short-range communication module to support communication based on Bluetooth, Infrared Data Association (IrDA), Radio Frequency Identification (RFID) or Near Field Communication (NFC), an input unit to receive input from hard keys, a wireless communication unit to support voice, video, and data communication, a wireless local area network module, and a battery to supply power to the above components.

In another exemplary embodiment, the touchscreen display apparatus illustrated in FIG. 1 may be realized as a desktop or notebook computer with either an integrated or peripheral touchscreen display.

The touchscreen 100 is an input/output means for input and display functions, and includes a display unit 110 and a touch panel 130.

The display unit 110 may display various data related to the operation and state of the touchscreen display. For example, the display unit 110 may display a screen such as lock screen, home screen, menu screen, message composition screen, document writing screen, photograph editing screen, chatting screen, and execution screen of an application being executed. In particular, the display unit 110 may display a visual effect through animation. For example, the display unit 110 may display an animation of a screen that is gradually crumpled, torn or folded. The display unit 110 may display an animation of a folded or crumpled garbage object that is gradually unfolded or smoothed out to restore the screen associated with the garbage object. The display unit 110 may display an animation of a garbage object that is moved in a preset direction. Screens displayable by the display unit 110 are described in detail later with reference to the drawings.

The display unit 110 may be realized using liquid crystal display (LCD) devices, light emitting diodes (LED), organic light emitting diodes (OLED) or active matrix organic light emitting diodes (AMOLED). The display unit 110 may be realized using a flexible display technology based on a thin and flexible substrate. In this case, the display unit 110 may be warped, bended or rolled without damage. The display unit 110 may display screen data in portrait or landscape mode.

The touch panel 130 may be placed on the display unit 110, and sense touch input on the surface of the touchscreen 100. The touch panel 130 may be of an add-on type (the touch panel 130 is placed on the display unit 110) or an on-cell or in-cell type (the touch panel 130 is inserted into the display unit 110). The touch panel 130 detects a touch event generated by the user, generates an signal corresponding to the detected touch event, and sends the signal to the control unit 300. The control unit 300 may perform a function associated with the touched region on the basis of a signal sent by the touch panel 130. In particular, the touch panel 130 may sense a touch event corresponding to a multi-touch gesture on the lock screen or application execution screen.

The storage unit 200 stores various applications, and data created and used by the touchscreen display. The storage unit 200 may include one or more volatile and non-volatile memory devices. The storage unit 200 may include a read only memory (ROM), random access memory (RAM), flash memory and hard disk (HDD), and may further include an external storage media such as an external hard disk or memory card. The storage unit 200 may store an operating system for the touchscreen display apparatus, a program and data for controlling operation of the display unit 110, and a program and data for touch event input and subsequent processing thereof (for example, animation, sound or haptic processing) to produce visual effects indicative of the appearance, behavior, sound, and/or feel of physical paper. In particular, the storage unit 200 may store setting information 250 to configure operations for producing visual effects indicative of the appearance, behavior, sound, and/or feel of physical paper. The setting information 250 may contain information elements as listed in Table 1.

TABLE 1

| Option | Setting |
|---|---|
| Animation | Crumple |
|  | Fold |
|  | Tear |
|  | Random |
| Garbage object | Crumpled globe |
|  | Torn pieces |
|  | Folded miniature |
|  | Random |
| Location of garbage object | Fixed (center) |
|  | Random |
|  | Touch dependent |
| Automatic deletion of garbage object | On |
|  | Off |
| Movement time of garbage object | 1 second |
|  | 2 seconds |
|  | 3 seconds |
| Movement direction of garbage object | Trash bin icon |
|  | Gesture direction |
|  | Random |
| Shadow effect of garbage object | On |
|  | Off |
| Sound effect | On |
|  | Off |
|  | Sound 1 |
|  | Sound 2 |
|  | Sound 3 |
|  | Random |
| Haptic effect | On |
|  | Off |
|  | Vibration 1 |
|  | Vibration 2 |
|  | Vibration 3 |
|  | Random |
| . . . | . . . |

As illustrated in Table 1, the setting information 250 contains options and their setting values needed to realize the functions of exemplary embodiments. For example, an animation converting a screen to a new garbage object may be set to one of crumpling, folding, tearing, or at random. The shape of a garbage object representing a task or activity ready to be deleted or canceled may be set to one of a crumpled globe (for example, a substantially spherical shape), torn pieces, folded miniature (for example, paper airplane, paper boat, etc.), or at random. The setting information 250 may also specify options related to moving the garbage object to the trash bin icon for task removal, such as movement time and direction of the garbage object. An option may be set to automatically delete a garbage object once it is created. When the option for automatic deletion is set to "on", the garbage object may be automatically moved to the trash bin icon or be moved in a preset direction and removed.

In addition, a shadow effect may be set for the garbage object, and sound effect and haptic effect may be set for the garbage object during movement or deletion. For example, a sound/haptic effect of crumpling a sheet of paper may be output when an application screen is crumpled. A sound/haptic effect of smoothing out crumpled paper may be output when a garbage object is smoothed out. A sound effect of a sheet of paper moving and a sound/haptic effect of the paper entering a trash can may be output when the garbage object is moved to the trash bin icon and disappears. The sound and haptic effects may be set individually or collectively by the user.

The setting information 250 may specify applications that can produce visual effects indicative of the appearance, behavior, sound, and/or feel of physical paper. For example, applications supporting user input and editing, such as a memo application, message application, document writing application and photograph editing application, may be set as an application producing visual effects of exemplary embodiments. A lock application, which locks and unlocks the screen in response to user input, may also be set as an application producing visual effects.

The setting information 250 may be defined by the user, and may be stored as a table with mappings between options and setting values.

The audio processing unit 400 sends an audio signal from the control unit 300 to a speaker SPK, and sends an audio signal from a microphone MIC to the control unit 300. Under control of the control unit 300, the audio processing unit 400 may convert a voice/audio signal from the control unit 300 into an audible sound through the speaker SPK, and convert an audio signal like a voice signal from the microphone MIC into a digital signal and send the digital signal to the control unit 300. In particular, under control of the control unit 300, the audio processing unit 400 may output sound feedback corresponding to a visual effect indicative of the appearance, behavior, sound, and/or feel of physical paper (for example, a sound effect of a sheet of paper being crumpled or smoothed out) through the speaker SPK. Sound effects for an application screen being crumpled like a sheet of paper, a garbage object being smoothed out, and a garbage object being moved to the trash bin icon may be set differently. Sound feedback output by the audio processing unit 400 may be set differently according to animation effects in progress.

The vibration motor 500 generates vibrations under control of the control unit 300. In particular, the vibration motor 500 provides haptic feedback. That is, the control unit 300 may control the vibration motor 500 to produce haptic feedback corresponding to a sheet of paper being crumpled, smoothed out or moved in response to a touch event. Haptic feedback produced by the vibration motor 500 may be set differently according to animation effects in progress.

The control unit 300 controls overall operation of the touchscreen display. In particular, the control unit 300 may control operations to produce visual effects indicative of the appearance, behavior, sound, and/or feel of physical paper. For example, the control unit 300 may display a screen of a user function (for example, application screen, lock screen, idle screen and the like) on the display unit 110. In response to a multi-touch event on the screen, the control unit 300 may produce an animation effect where the screen is turned into a garbage object (representing cancellation, removal or screen transition). The garbage object may have a shape of a crumpled globe, torn pieces or folded miniature according to the setting information 250. Here, the control unit 300 may adjust pace of the animation effect according to the speed and/or duration of the multi-touch event (for example, the speed or duration of multi-touch drag). The control unit 300 may also make a transition from one screen to another without creation of a garbage object according to the setting information 250.

When a single-touch event is detected in the presence of the garbage object, the control unit 300 may produce an animation effect where the garbage object is moved in a specific direction and removed from the screen, and cancel or delete a task or activity performed on the screen. Here, when the trash bin icon is present on the current screen, the control unit 300 may control an operation to move the garbage object in a direction toward the trash bin icon. The control unit 300 may also control an operation to move the garbage object in a direction specified in the setting information 250 (in a direction of the touch event, in a direction toward the trash bin icon, or in a random direction).

When a multi-touch event is detected in the presence of the garbage object, the control unit 300 may produce an animation effect where the garbage object is turned back to the screen associated with the garbage object. Here, the control unit 300 may adjust pace of the animation effect according to the amount of change in movement speed and/or time of the multi-touch event (for example, changes in speed or time of multi-touch drag).

The control unit 300 may produce a sound effect and/or a haptic effect as feedback together with an animation effect according to the setting information 250.

As described above, the control unit 300 senses touch events on the touch panel 130 and produces various effects indicative of the appearance, behavior, sound, and/or feel of physical paper according to the types of the touch events. To achieve this, the control unit 300 may include a graphics processing unit (GPU) 350. The GPU 350 processes display data and displays animation of a garbage object being transformed in response to user touch events. Specifically, when a multi-touch event detected on a screen corresponds to a multi-touch and move gesture like pinch, the GPU 350 produces an animation of the screen being turned into a garbage object. When a single-touch event detected on the garbage object corresponds to a single-touch and move gesture, the GPU 350 produces an animation of the garbage object that is moved to the trash bin icon or in a preset direction and removed. When a multi-touch event detected on the garbage object corresponds to a multi-touch and move gesture such as spread, the GPU 350 produces an animation effect where the garbage object is restored to the screen associated with the garbage object. During various animations, when a touch event is released before the progress of an animation reaches a threshold value (described later), the GPU 350 may restore the original state prior to the animation. That is, the GPU 350 may produce visual effects indicative of the appearance, behavior, sound, and/or feel of physical paper (for example, presentation of a sheet of paper being crumpled or smoothed out) through animation on the touchscreen display.

Animation processing may be performed by both the GPU 350 and an application processor (AP) of the control unit 300. That is, the control unit 300 may be realized using a system on chip (SoC) package of a central processing unit (CPU), AP and GPU, or realized using a multi-layer package of a CPU, AP and GPU.

As described above, the control unit 300 controls overall operation for the functions of the touchscreen display apparatus. Detailed operations of the control unit 300 are described later with reference to the drawings. In addition, the control unit 300 may control operations related to normal functions of the touchscreen display. For example, the control unit 300 may execute a requested application and control screen display for the application. The control unit 300 may receive an input signal corresponding to a touch gesture and control execution of a function according to the input signal. The control unit 300 may also control operations related to data transmission and reception based on wired or wireless communication.

The touchscreen display apparatus of FIG. 1 may be any form of an information and communication appliance using an AP, CPU or GPU, such as a mobile communication terminal supporting a communication protocol for a communication system, a desktop computer with either an integrated or peripheral touchscreen display, a notebook computer, a tablet computer, a smartphone, a digital camera, a portable multimedia player (PMP), a media player, a portable game console, and a personal digital assistant (PDA). In addition, the operation control method of the exemplary embodiments may be applied to various display devices such as a digital television set, a large format display, digital signage, and a laptop computer.

FIG. 2 is screen representations illustrating user interactions to produce a user experience indicative of the appearance, behavior, sound, and/or feel of physical paper on a touchscreen display according to exemplary embodiments.

Referring to FIG. 2, as indicated by reference numerals 201 to 207, a user interface (UI) screen is divided into a static region A that does not change in shape in a manner indicative of physical paper, and an animation region B that changes in shape in a manner indicative of physical paper in response to a touch event.

The static region A may include a status bar indicating status information of the touchscreen display (for example, received signal strength, battery state, and vibration, sound or silent mode) as indicated by reference numeral 201. The static region A may further include a function icon region (extended menu region, tool menu region, etc.) to control an application being executed as indicated by reference numeral 203 or 205. The static region A may be hidden according to an executed application as indicated by reference numeral 207.

As indicated by reference numeral 203, the extended menu region may include a trash bin icon onto which a garbage object may be moved and an extended menu icon for menu activation. As indicated by reference numeral 205, the extended menu region may further include activated edit tool icons to support edit operations on the current UI screen activated by the extended menu icon. Here, the trash bin icon may be shifted to accommodate the activated edit tool icons.

The animation region B of a UI screen is a region in which an animation is displayed to present a user experience indicative of the appearance, behavior, sound, and/or feel of physical paper. In the animation region B, an application screen is displayed, an animation is displayed so that the application screen is crumpled or smoothed out in response to a touch event, and an animation is carried out so that a garbage object is moved in a preset direction and removed. The animation region B may be presented together with the static region A in the UI screen as indicated by reference numerals 201 to 205 or may be presented as a full screen as indicated by reference numeral 207 according to the type of an application being executed.

Figure 3:
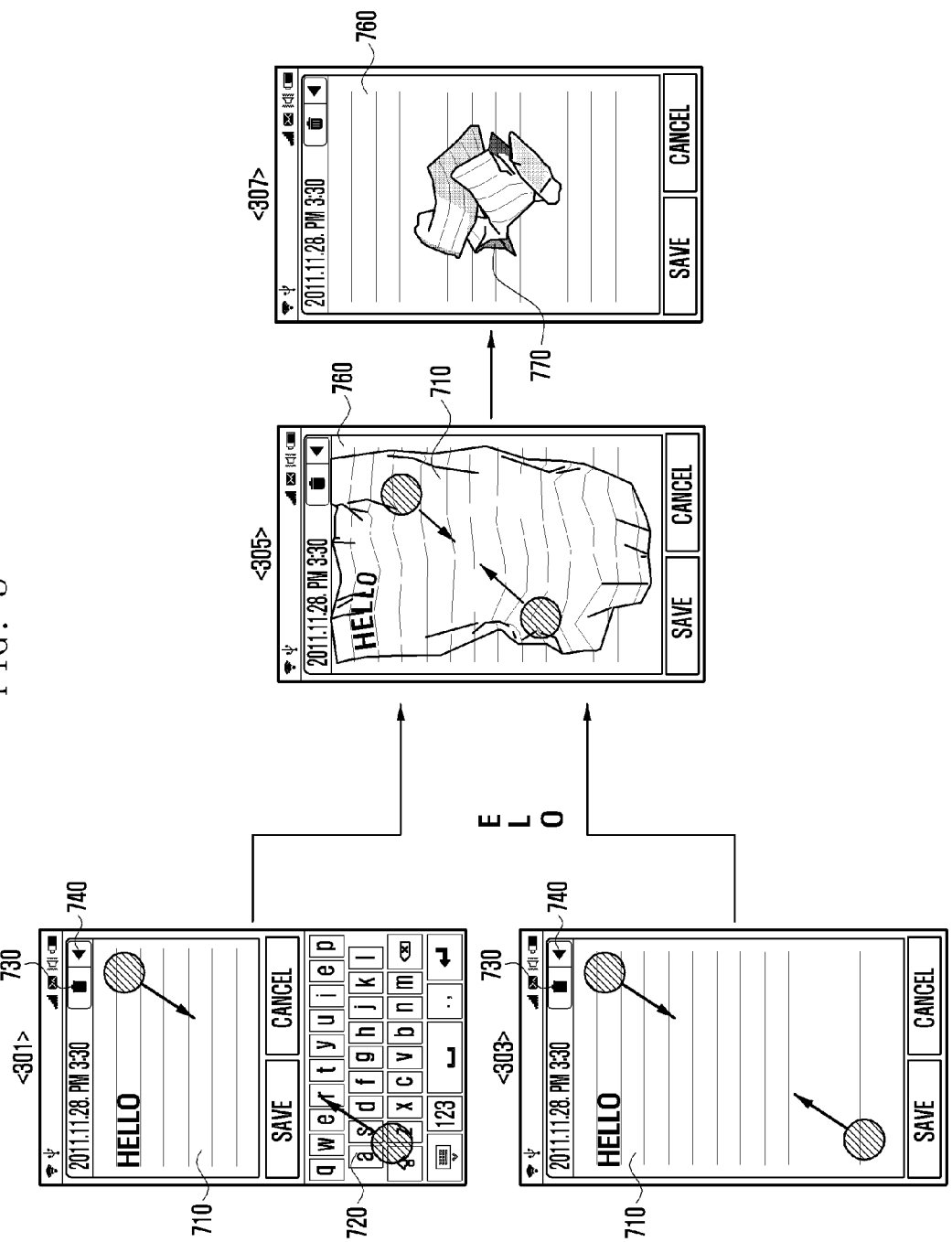
FIG. 3 is screen representations illustrating turning an application screen into a garbage object in stages on a touchscreen display according to exemplary embodiments.

FIG. 3 is screen representations illustrating conversion of an application screen into a garbage object on a touchscreen display according to exemplary embodiments.

In FIG. 3, an illustration of an application screen that is turned into a garbage object is provided, the animation option is crumpling and the garbage object is a crumpled globe. That is, an application screen is turned into a garbage object on a touchscreen display.

As indicated by reference numerals 301 and 303, when a selected application is executed, a first screen 710 is displayed. For example, as a memo application is executed, a memo pad screen may be displayed. Here, together with the first screen 710, a virtual keypad 720 for memo input may be activated as indicated by reference numeral 301 or be deactivated as indicated by reference numeral 303.

Specifically, reference numeral 301 indicates that the first screen 710 is divided into an input region like the virtual keypad 720 and a display region to display data entered through the input region; and reference numeral 303 indicates that the first screen 710 is composed only of a display region. In a state indicated by reference numeral 301, when the user makes a single-touch gesture like a tap on the virtual keypad 720, data like a character is entered and displayed in the display region. In a state indicated by reference numeral 301, when a multi-touch gesture is made on two points of the input region and/or display region, an animation is displayed to produce visual effects as described below.

In a state indicated by reference numeral 301 or 303, the user may make a multi-touch gesture (for example, a pinch on two points of the first screen 710) to produce an animation effect involving the first screen 710. In an exemplary embodiment, a multi-touch gesture (for example, a pinch) is used to produce a visual effect indicative of a sheet of paper being crumpled. Together with such a visual effect, sound and/or vibration feedback indicative of a piece of paper being crumpled may also be provided.

More specifically, in a state indicated by reference numeral 301 or 303, the user may make a multi-point touch first and make a move while maintaining the multi-point touch (for example, a pinch gesture). Thus, when a multi-point touch is made, the control unit 300 may sense the multi-point touch, determine to enter a visual effect mode, and wait for subsequent gesture input.

To enter the visual effect mode, the control unit 300 may check whether the currently displayed screen is associated with an application which supports the visual effect mode. As described before, a memo application, message application, document writing application and photograph editing application are examples of applications supporting the visual effect mode. When the currently displayed screen is associated with an application which supports the visual effect mode, the control unit 300 may determine to enter the visual effect mode.

Thereafter, as indicated by reference numeral 305, the user may make a gesture (for example, a pinch decreasing the distance between the two touch points). This gesture may also correspond to drag or flick.

Then, the control unit 300 may present an animation of the first screen 710 being gradually crumpled as indicated by reference numeral 305. Additionally, the control unit 300 may display a crumpled garbage object 770 as a result of crumpling the first screen 710 as indicated by reference numeral 307. Here, the control unit 300 may determine pace of animation of the first screen being turned into the garbage object according to changes in movement speed and/or time of the multi-touch event (for example, changes in speed or time of multi-touch pinch, drag or flick).

As indicated by reference numeral 307, when the first screen 710 is turned into the garbage object 770, a second screen 760 may be presented as a background of the garbage object 770. Here, the second screen 760 may be a previous screen of the first screen 710, a new screen created by the current application, a screen of a previously executed application, an idle screen, etc. For example, while writing a memo using a memo application, the user may make a multi-touch gesture as described above to delete the current memo. Then, the memo pad screen may be crumpled and turned into a garbage object 770 and a new memo pad screen may be presented as a background as indicated by reference numeral 307.

When the first screen 710 is turned into a garbage object 770 in response to a multi-touch gesture, the location of the garbage object 770 may be randomly selected as indicated by reference numeral 307. As described before, when a garbage object is created, the garbage object may be placed at a fixed location (for example, the center), a randomly selected location, or a location depending on the multi-touch gesture according to the setting information 250. Here, for a multi-touch gesture, when one of the two touch points is moved and the other is fixed, the garbage object may be placed around the fixed touch point.

The second screen 760 is gradually presented according to progress of the animation crumpling the first screen 710 into the garbage object 770 as indicated by reference numerals 305 and 307. The second screen 760 may be presented as a background of the garbage object 770 when the first screen 710 is turned into the garbage object 770. Here, in the presence of the garbage object 770, user input on the second screen 760 may be ignored as invalid input, and user input only on the garbage object 770 may be processed as valid input.

Figure 4:
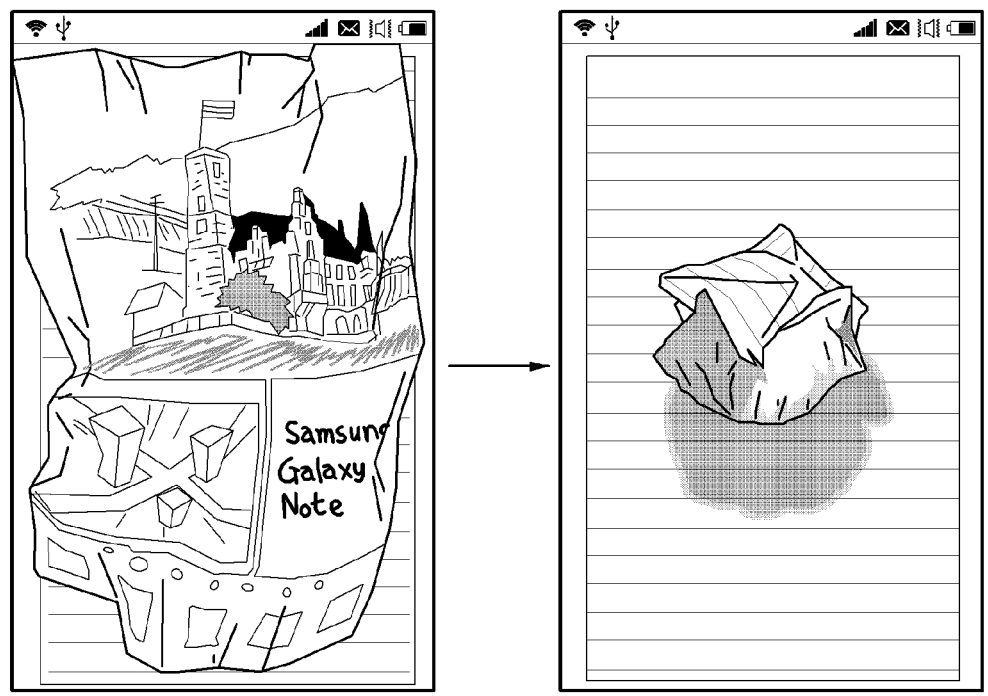
FIGS. 4 to 6 are screen representations illustrating shapes of the garbage object according to exemplary embodiments.
Figure 5:
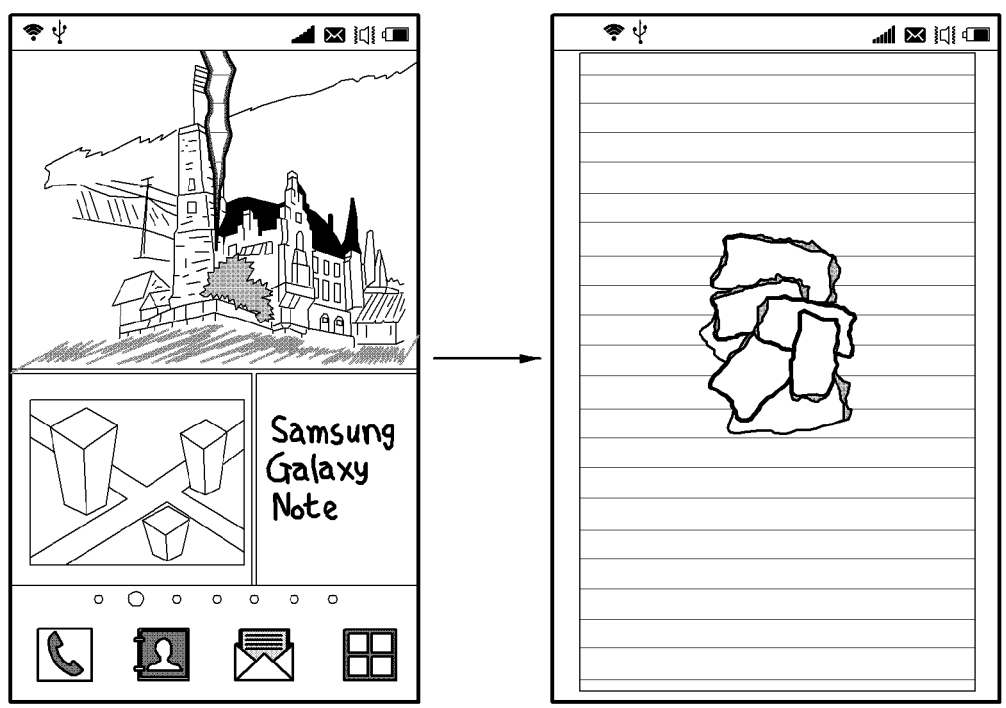
Figure 6:
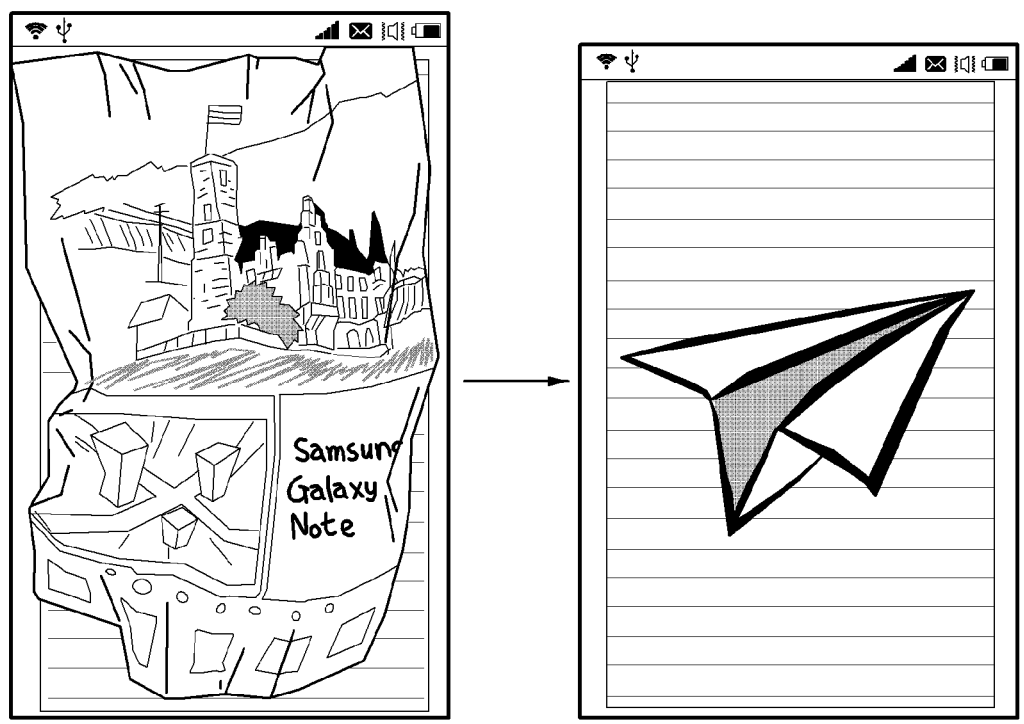

FIGS. 4 to 6 are screen representations illustrating shapes of the garbage object on a touchscreen display according to exemplary embodiments.

In FIG. 4, the animation option of the setting information 250 is "crumpling" and the garbage object is in a form of a crumpled globe. In FIG. 5, the animation option is "tearing" and the garbage object is in a form of torn pieces. In FIG. 6, the animation option is "folding" and the garbage object is in a form of a folded miniature (for example, a paper airplane).

As shown in FIG. 4, the user may make a multi-touch gesture (for example, a pinch) on an application screen displayed on the display unit 110 to thereby turn the application screen into a garbage object in the form of a crumpled globe. There may be presented an animation where the application screen is crumpled gradually during movement of the multi-touch gesture and is turned into the garbage object of a globe type upon release of the multi-touch gesture.

As shown in FIG. 5, the user may make a multi-touch gesture (for example, a pinch) on an application screen displayed on the display unit 110 to thereby turn the application screen into a garbage object in the form of torn pieces. There may be presented an animation where the application screen is torn gradually during movement of the multi-touch gesture and is turned into the garbage object in the form of torn pieces upon release of the multi-touch gesture.

As shown in FIG. 6, the user may make a multi-touch gesture (for example, a pinch) on an application screen displayed on the display unit 110 to thereby turn the application screen into a garbage object in the form of a folded miniature. There may be presented an animation where the application screen is folded gradually during movement of the multi-touch gesture and is turned into the garbage object in the form of a folded miniature upon release of the multi-touch gesture.

In FIGS. 4 to 6, one type of garbage object is used for a given animation option. However, the exemplary embodiments are not limited thereto. That is, various types of garbage objects may be used for a given animation option. For example, in FIG. 4, when the animation option is "crumpling", the garbage object may take the form of a globe, pieces or a miniature. In FIG. 5, when the animation option is "tearing", the garbage object may be in the form of pieces, a globe or a miniature. In FIG. 5, when the animation option is "folding", the garbage object may be in the form of a miniature, a globe or pieces.

Figure 7:
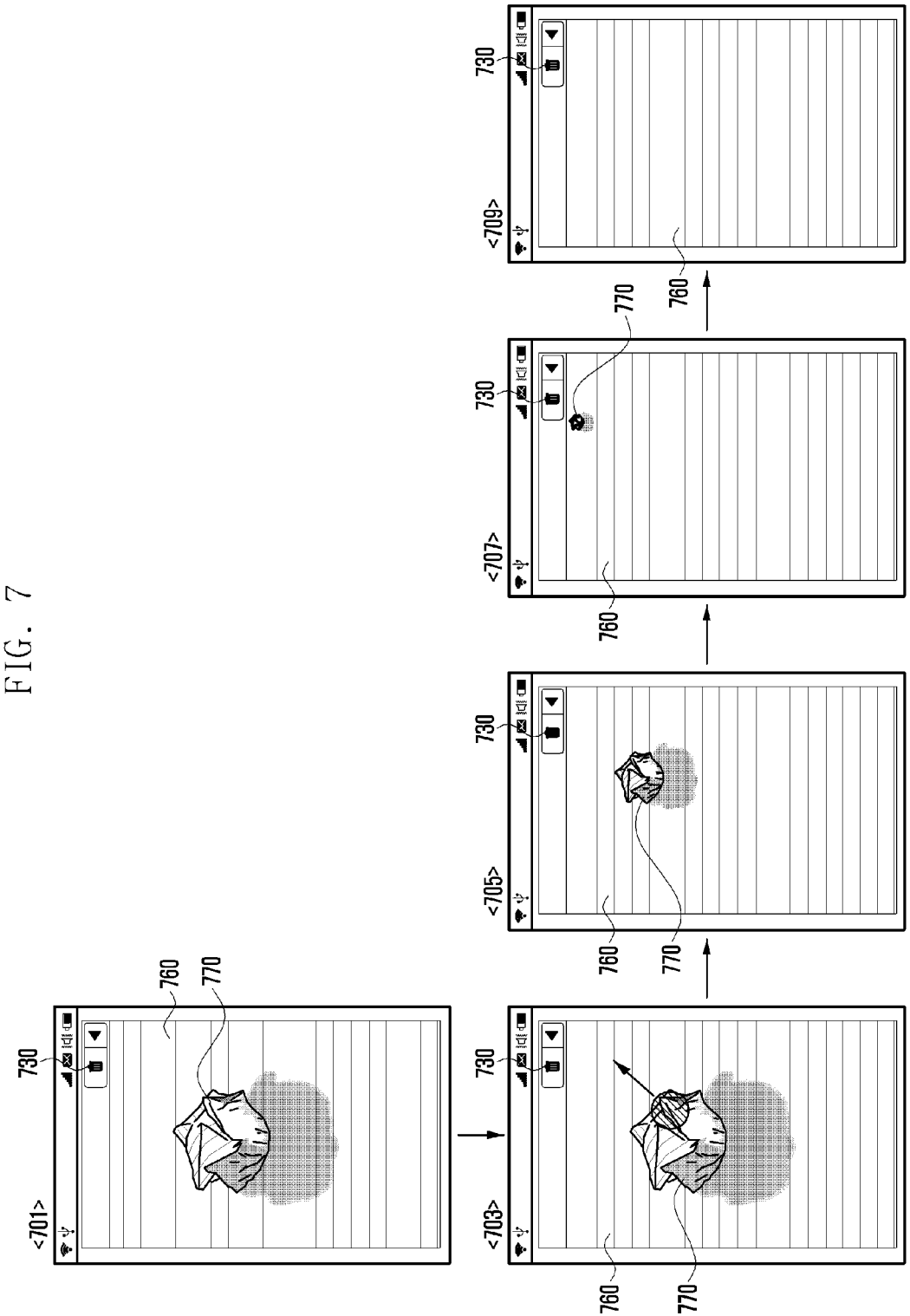
FIG. 7 is screen representations illustrating deleting the current task by moving the garbage object in stages according to exemplary embodiments.

FIG. 7 is screen representations illustrating presentation of visual effects on a touchscreen display according to exemplary embodiments.

In FIG. 7, after an application screen is turned into a garbage object (as in a state indicated by reference numeral 307), the garbage object is moved in a preset direction to thereby delete or cancel an item or a task associated with the application screen.

As indicated by reference numeral 701, it is assumed that the first screen 710 is turned into a garbage object 770 and the second screen 760 is presented as a background of the garbage object 770.

The user may make a single-touch gesture (for example, a drag or a flick) by touching the garbage object 770 in a state indicated by reference numeral 701 and move the garbage object 770 in a direction as indicated by reference numeral 703. Then, the control unit 300 may move the garbage object 770 in a preset direction. Here, the garbage object 770 may be moved in a direction toward the trash bin icon 730, in a direction of the touch gesture, or in a random direction according to the setting information 250. When the trash bin icon 730 is displayed, the control unit 300 may move the garbage object 770 in a direction toward the trash bin icon 730 regardless of the direction of the touch gesture. That is, the garbage object 770 may be moved in a direction toward the trash bin icon 730 or in a direction of the single-touch gesture according to presence of the toward the trash bin icon 730. In FIG. 7, the trash bin icon 730 is displayed and the garbage object 770 is described as being moved in a direction toward the trash bin icon 730 regardless of the direction of a single-touch gesture.

Movement of the garbage object 770 may be modeled using one of a straight line, a parabola and a curve leading to the destination according to the setting information 250. Movement speed thereof may be given by a constant velocity in terms of total time to reach the destination (for example, 1, 2 or 3 seconds) or distance per second (for example, 50 cm/s or 30 cm/s).

When the user makes a single-touch gesture by touching the garbage object 770 and moving the same in a direction as indicated by reference numeral 703, the control unit 300 may produce an animation effect of moving the garbage object 770 toward the trash bin icon 730 as indicated by reference numerals 703 to 707. Here, as indicated by reference numerals 703 to 707, the size of the garbage object 770 may become smaller with increasing movement distance. When the shadow effect option is "on", the control unit 300 may move and change the shadow of the garbage object 770 in accordance with movement and change of the garbage object 770. The control unit 300 may control an operation so that the garbage object 770 is moved toward the trash bin icon 730 at a constant velocity.

When the garbage object 770 is moved close to the trash bin icon 730 as indicated by reference numeral 707, the control unit 300 may produce an animation effect where the garbage object 770 is dropped into the trash bin icon 730 and removed from the screen as indicated by reference numeral 709. When the garbage object 770 is removed from the screen, the control unit 300 may activate the second screen 760.

In FIG. 7, the garbage object 770 is moved in a preset direction (for example, toward the trash bin icon) in response to a single-touch and move gesture (for example, a drag and flick). However, the garbage object may also be moved in response to a single-touch gesture (for example, a drag-and-drop, tap or double tap or to a multi-touch gesture like multi-point drag or multi-point flick).

Figure 8:
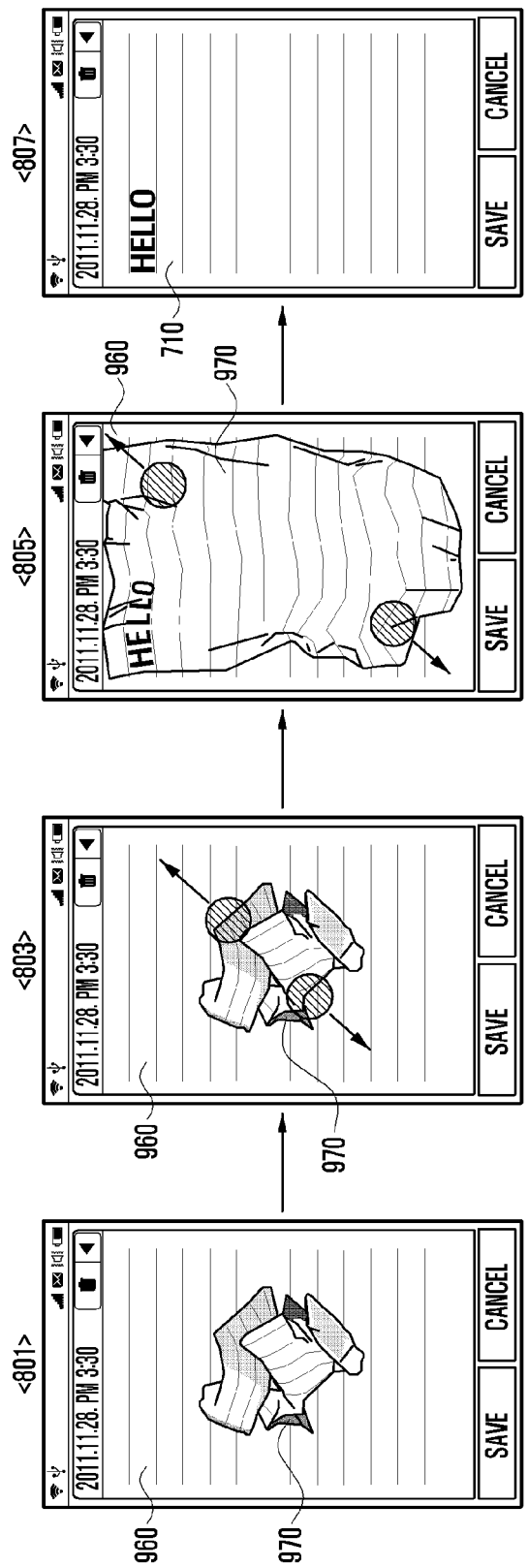
FIG. 8 is screen representations illustrating recovering an application screen from the garbage object in stages according to exemplary embodiments.

FIG. 8 is screen representations illustrating presentation of visual effects on a touchscreen display according to exemplary embodiments.

In FIG. 8, after an application screen is turned into a garbage object (as in a state indicated by reference numeral 307), the application screen is recovered.

As indicated by reference numeral 801, the first screen 710 is turned into a garbage object 970 and a second screen 960 is presented as a background. The user may make a multi-touch gesture like spread on the garbage object 770 in a state indicated by reference numeral 701 to thereby produce an animation effect where the garbage object 970 is turned back into the first screen 710. In one embodiment, the multi-point spread event is used to produce a visual effect where crumpled paper is smoothed out. Together with such a visual effect, sound feedback like paper smoothing out or vibration feedback may also be produced.

More specifically, in a state indicated by reference numeral 801, the user may make a multi-point touch on the garbage object 970 as indicated by reference numeral 803, and make a spread gesture as indicated by reference numeral 805. That is, the distance between the two touch points is increased by moving the two touch points in opposite directions.

Then, the control unit 300 may produce an animation effect where the garbage object 970 is gradually smoothed out and the first screen 710 is gradually recovered as indicated by reference numerals 803 and 805, and present the recovered first screen 710 as indicated by reference numeral 807. Here, the control unit 300 may determine pace of animation of the garbage object 970 being turned back into the first screen according to the speed and/or duration of the multi-touch event (for example, the speed and/or duration of multi-point spread).

As indicated by reference numerals 805 and 807, as the garbage object 970 is gradually smoothed out, the first screen 710 is gradually recovered and the second screen 960 is gradually hidden. When the first screen 710 is fully recovered and activated, the second screen 960 may be placed in a background state.

Figure 9:
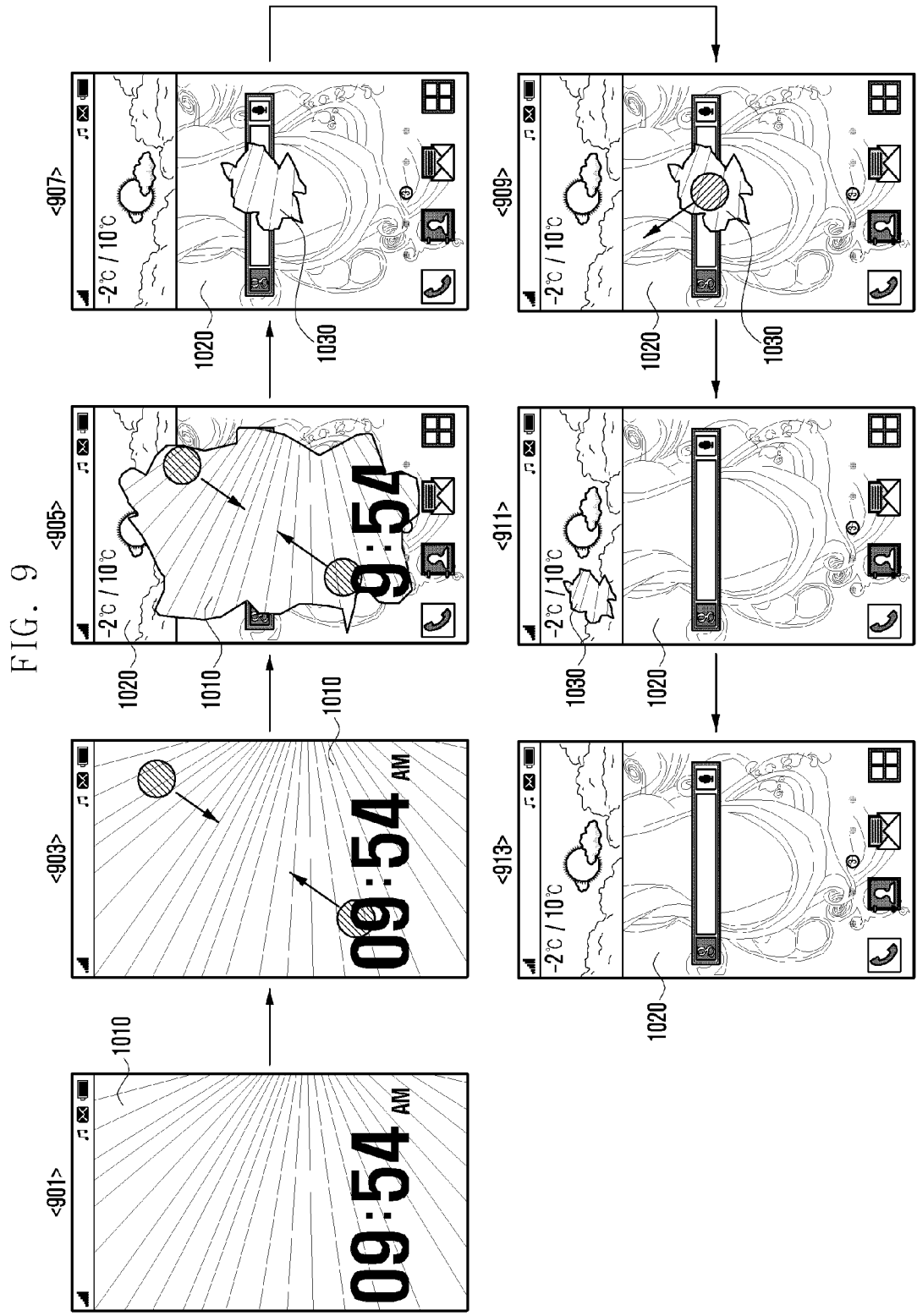
FIG. 9 is screen representations for illustrating interactions to produce visual effects on a touchscreen display according to exemplary embodiments.

FIG. 9 is a screen representations illustrating presentation of visual effects on a touchscreen display according to exemplary embodiments.

In FIG. 9, to unlock the screen, a lock screen is turned into a garbage object and the garbage object is moved.

As indicated by reference numerals 901, when a selected application is executed, a first screen 1010 may be displayed. Here, the first screen 1010 may be a lock screen.

In a state indicated by reference numeral 901, the user may make a multi-touch gesture (for example, a pinch on two points of the first screen 1010) to produce an animation effect involving the first screen 1010. Here, when a multi-point touch is made as indicated by reference numeral 903, the control unit 300 may sense the multi-point touch, determine to enter a visual effect mode, and wait for subsequent gesture input.

When a subsequent move gesture (for example, a pinch) is detected, the control unit 300 may present an animation effect where the first screen 1010 is gradually crumpled as indicated by reference numeral 905 and a garbage object 1030 is gradually presented as indicated by reference numeral 907. Here, the garbage object 1030 may be placed at a fixed location (for example, the center), a randomly selected location, or a location depending on the multi-touch gesture according to the setting information 250.

As indicated by reference numerals 903 to 907, a second screen 1020 (for example, the home screen) is gradually presented according to progress of the animation crumpling the first screen 1010 into the garbage object 1030. The second screen 1020 may be presented as a background of the garbage object 1030 when the first screen 1010 is turned into the garbage object 1030. Here, in the presence of the garbage object 1030, user input on the second screen 1020 may be ignored as invalid input, and only user input on the garbage object 1030 may be processed as valid input.

The user may make a single-touch gesture (for example, a drag or a flick by touching the garbage object 1030 in a state indicated by reference numeral 907 and move the garbage object 1030 in a direction as indicated by reference numeral 909. Then, the control unit 300 may move the garbage object 1030 in a preset direction. As a trash bin icon is not displayed in FIG. 9, the garbage object 1030 may be moved in a direction of the touch gesture. That is, when the user makes a move gesture in a direction as indicated by reference numeral 909, the control unit 300 may move the garbage object 1030 in a direction of the move gesture as indicated by reference numeral and 911.

When the garbage object 1030 is moved off of the screen, the control unit 300 removes the garbage object 1030 from the screen as indicated by reference numeral 913. When the garbage object 1030 is removed from the screen, the control unit 300 may unlock the screen and activate the second screen 1020.

Figure 10:
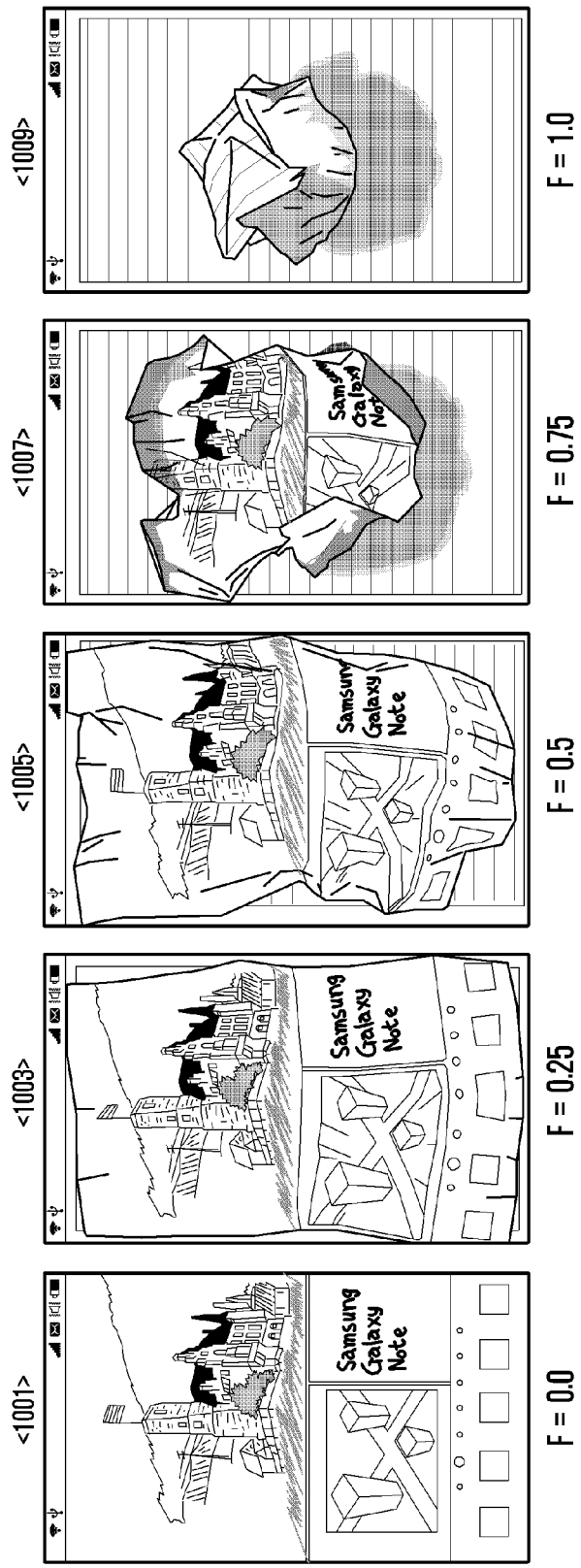
FIG. 10 is screen representations illustrating creating a garbage object according to exemplary embodiments.

FIG. 10 is screen representations illustrating the creation of a garbage object according to exemplary embodiments.

Referring to FIG. 10, a crumple factor f may be used to describe the degree of crumpling of an application screen. For example, as indicated by reference numeral 1001, a regular application screen without crumpling has a crumple factor of 0 (f=0).

Reference numeral 1003 indicates an application screen that is slightly crumpled in response to a multi-touch gesture (for example, a pinch). The application screen indicated by reference numeral 1003 may be assumed to have a crumple factor of 0.25 (f=0.25).

Reference numeral 1005 indicates an application screen that is more severely crumpled than that indicated by reference numeral 1003 in response to a multi-touch gesture (for example, a pinch). The application screen indicated by reference numeral 1005 may be assumed to have a crumple factor of 0.5 (f=0.5).

Reference numeral 1007 indicates an application screen that is more severely crumpled than that indicated by reference numeral 1005 in response to a multi-touch gesture (for example, a pinch). The application screen indicated by reference numeral 1005 may be assumed to have a crumple factor of 0.75 (f=0.75).

Reference numeral 1009 indicates an application screen that is completely crumpled and turned into a garbage object in response to a multi-touch gesture (for example, a pinch. The completely crumpled application screen (garbage object) indicated by reference numeral 1009 may be assumed to have a crumple factor of 1 (f=1).

According to exemplary embodiments, the crumple factor f of an application screen may be computed by the following equation.

$$f = 1 - \frac{\text{current distance}}{\text{initial distance}} \qquad \text{[Equation 1]}$$

As indicated by Equation 1, the crumple factor f may have a value between 0 (without crumpling prior to occurrence of animation effect) and 1 (completely crumpled and turned into garbage object as result of animation effect). Here, "initial distance" denotes the distance between two touch points of a multi-touch gesture before movement and is assumed to be 1 (not actual distance), and "current distance" denotes the distance between the two touch points of the multi-touch gesture during movement and is measured relative to 1 (not actual distance).

As shown in FIG. 10, the touchscreen display may present an animation effect where an application screen is gradually crumpled in response to a multi-touch gesture (for example, a pinch). Such an animation effect may be depicted and regulated by repeatedly computing the crumple factor using Equation 1 after detection of a touch event.

Figure 11:
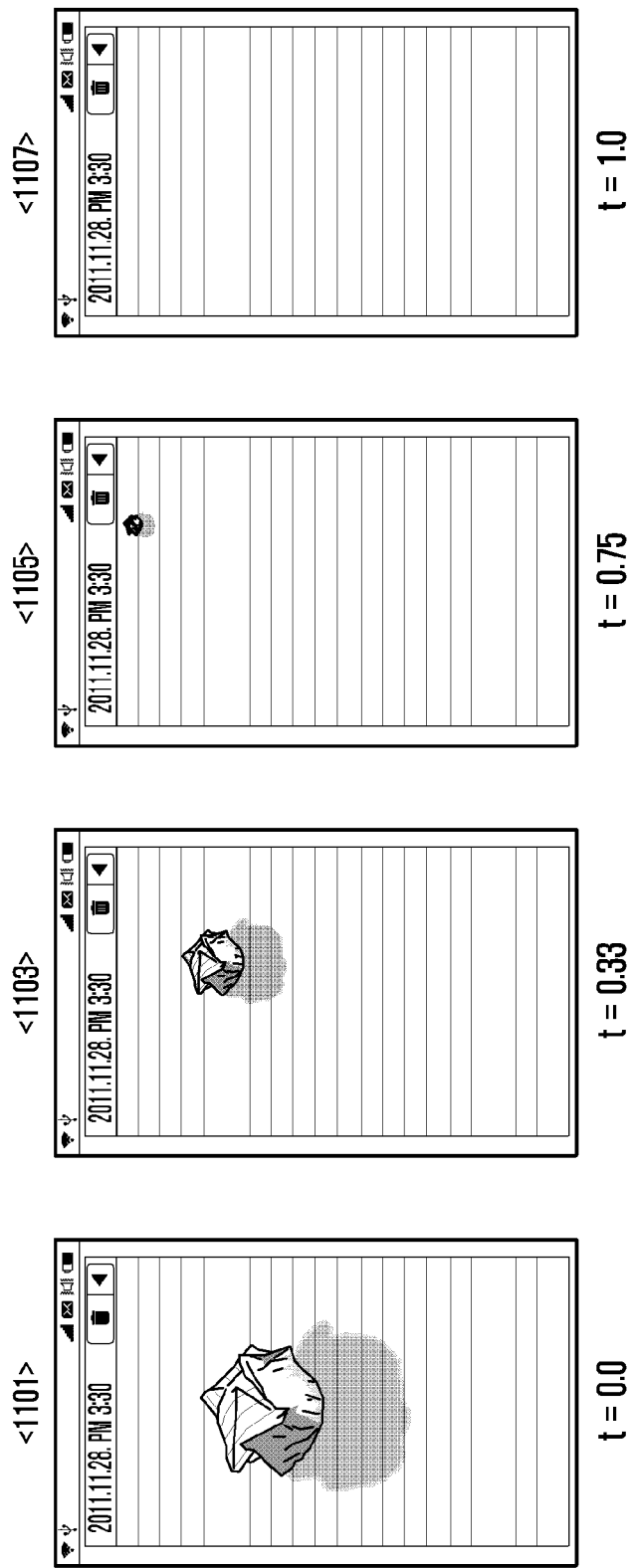
FIG. 11 is screen representations illustrating moving the garbage object according to exemplary embodiments.

FIG. 11 is screen representations illustrating the movement of a garbage object on a touchscreen display according to exemplary embodiments.

As shown in FIG. 11, movement of a garbage object may be represented by a relative time value (i.e. a ratio of the duration of a user input relative to a total animation time). Reference numeral 1101 indicates a garbage object at the time when an application screen is completely turned into the garbage object at a preset location. When a garbage object is created at a preset location without movement as indicated by reference numeral 1101, the location of the garbage object may be represented by a time value of 0 (t=0).

Reference numeral 1103 indicates the garbage object at the time when it is moved by a distance in a preset direction (for example, toward the trash bin icon or in a direction of a touch gesture) in response to a touch event. The garbage object may become smaller according to time or distance. The location of the garbage object indicated by reference numeral 1103 may be represented by a time value of 0.33 (t=0.33).

Reference numeral 1105 indicates the garbage object at the time when it is moved farther than that indicated by reference numeral 1103. The garbage object became smaller. The location of the garbage object indicated by reference numeral 1105 may be represented by a time value of 0.75 (t=0.75).

Reference numeral 1107 indicates that the garbage object is moved to the destination and removed from the screen. When the garbage object is removed from the screen in response to a touch event as indicated by reference numeral 1107, the time value is set to 1 (t=1). That is, it is assumed that the garbage object is removed from the screen at a relative time of 1 after occurrence of a touch event. Removal of the garbage object at the destination from the screen may be depicted through a fade-out effect.

According to exemplary embodiments, movement of a garbage object with time may be described using the following equations.

$$l = (1-t) * P_{Start} + (t) * P_{End} \qquad \text{[Equation 2]}$$

$$t = \frac{\text{current time} - \text{start time}}{\text{total animation time}} \qquad \text{[Equation 3]}$$

In Equation 2, l denotes the location of the garbage object and may have a value between 0 (initial value before movement) and 1 (final value at removal after movement). l has a maximum value when the garbage object is moved to the destination and removed from the screen. t denotes relative time of movement of the garbage object and may be computed by dividing difference between the current time and start time by the total animation time as in Equation 3. $P_{Start}$ indicates the initial location of the garbage object at the beginning of movement, and $P_{End}$ indicates the final location thereof at the end of movement.

As shown in FIG. 11, the touchscreen display may present an animation effect where the garbage object is moved in a preset direction in response to a single-touch event and the size of the garbage object may become gradually smaller with time. Movement of the garbage object may be depicted and regulated by repeatedly computing the location of the garbage object and relative time using Equation 2 and Equation 3. The garbage object may be moved at a constant velocity. For example, when the time to reach the destination from the start position is set to 1 second, movement speed may be determined according to the total time of 1 second regardless of the distance to the destination and the garbage object may be moved at the determined speed (constant velocity). Alternatively, when movement speed is set to 50 cm/s, the garbage object may be moved at a constant velocity of 50 cm/s.

Figure 12:
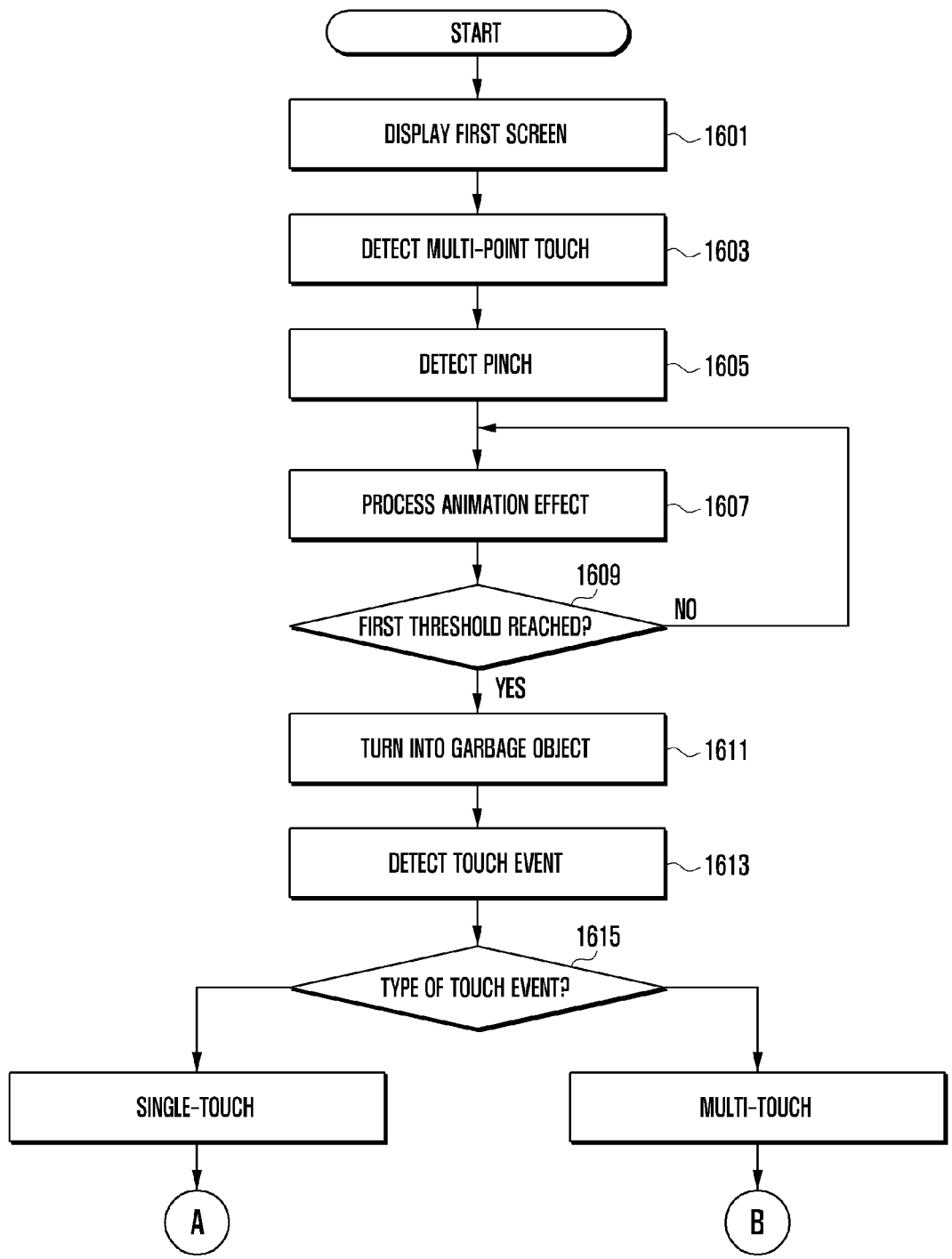
FIGS. 12 to 14 are flowcharts of a procedure for controlling production of visual effects according to exemplary embodiments.
Figure 13:
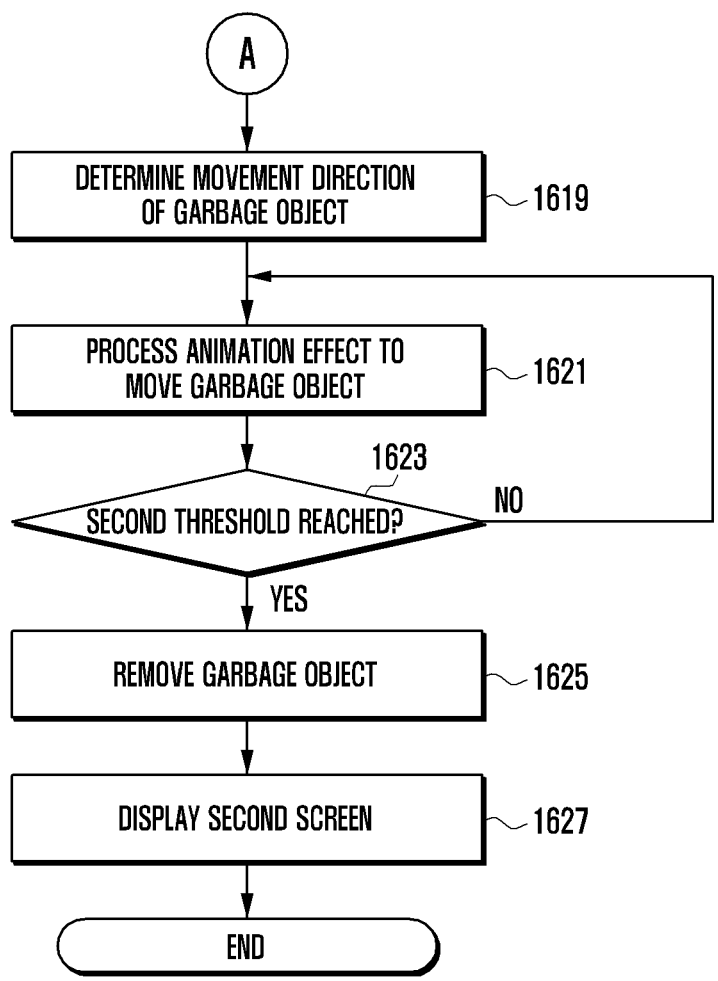
Figure 14:
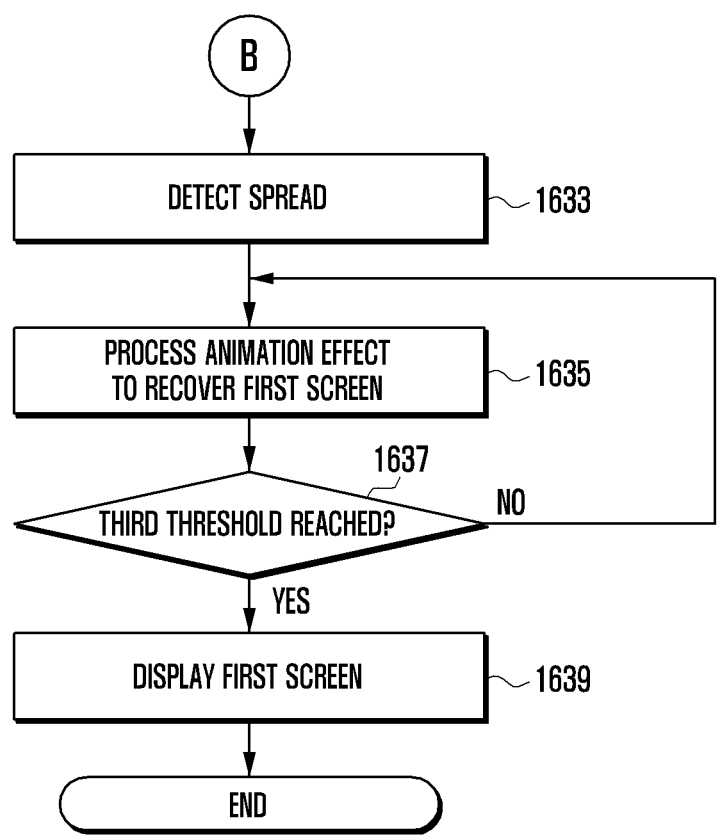

FIGS. 12 to 14 are flowcharts of a procedure for controlling production of visual effects according to another exemplary embodiment.

Referring to FIG. 12, the control unit 300 of the touchscreen display displays a first screen and controls operations on the first screen (1601). For example, when a memo application is executed according to user request, the control unit 300 may display a memo pad screen and control memo data input.

The control unit 300 detects a multi-point touch on the first screen (1603). For example, the user may make a touch gesture with two touch points on the first screen. The control unit 300 may sense the multi-point touch, determine to enter the visual effect mode, and await subsequent gesture input.

The control unit 300 detects a multi-point move event (for example, a pinch) on the first screen (1605). For example, the user may decrease the distance between the two touch points. The control unit 300 may detect a pinch gesture. Here, instead of multi-point pinch, multi-point drag or multi-point flick may be used.

When a multi-point move event (for example, a pinch) is detected, the control unit 300 starts to present an animation effect of the first screen (1607). For example, the control unit 300 may presents an animation effect wherein the first screen is gradually crumpled in a manner indicative of a physical sheet of paper and turned into a garbage object. Together with the animation effect, the control unit 300 may also provide sound and/or a haptic feedback indicative of a physical sheet of paper being crumpled.

During animation effect presentation, the control unit 300 determines whether the distance between the two touch points becomes less than a first threshold (1609). Here, the first threshold is a reference value for turning an application screen into a garbage object in response to a multi-point move event (for example, a pinch). For example, the first threshold may correspond to a case where the two touch points are moved more than 2 cm in total. The first threshold may be set according to the screen size of the touchscreen display and may be changed according to environment settings.

When the distance between the two touch points is greater than or equal to the first threshold, the control unit 300 returns to step 1607 and continues to present the animation effect. In the event that the multi-point move gesture is released before the distance between the two touch points becomes less than the first threshold, the control unit 300 may recover the original first screen.

When the distance between the two touch points is less than the first threshold, the control unit 300 turns the first screen into a garbage object (1611). The garbage object may be presented at a region and in a form as specified in the setting information 250. For example, the garbage object may be placed at a fixed location (for example, center), a randomly selected location, or a location depending on the multi-touch gesture according to the setting information 250. Here, for a multi-touch gesture, when one of two touch points is moved and the other is fixed, the garbage object may be placed around the fixed touch point. The garbage object may take the form of a crumpled globe, torn pieces, folded miniature (for example, paper airplane, paper boat, etc.), or a random shape according to the setting information 250.

When the control unit 300 detects a touch event on the garbage object (1613), it determines whether the detected touch event corresponds to a single-touch gesture or a multi-touch gesture (1615). Here, the user may make a single-touch gesture to move the garbage object for removal or a multi-touch gesture to restore the first screen.

When the detected touch event corresponds to a single-touch gesture, referring to FIG. 13, the control unit 300 determines movement direction of the garbage object (1619). Here, the control unit 300 may refer to the setting information 250 to determine the movement direction. The garbage object may be moved in a direction toward the trash bin icon, in a direction of the touch event, or in a random direction.

Upon determination of the movement direction, the control unit 300 starts to present an animation effect of moving the garbage object in the determined direction (1621). For example, the control unit 300 may present an animation effect where the garbage object is moved at a constant velocity in the determined direction and becomes smaller with movement. Together with the animation effect, the control unit 300 may also produce a sound effect and/or a haptic effect as feedback.

During animation effect presentation, the control unit 300 checks whether the garbage object is moved to a second threshold (1623). Here, the second threshold indicates a location close to the trash bin icon 730 or the screen boundary and is a reference location at which the garbage object is removed from the screen.

When the garbage object is not yet moved to the second threshold, the control unit 300 returns to step 1621 and continues to present the animation effect. In the event that the single-touch gesture is released before the garbage object is moved to the second threshold, the control unit 300 may restore the garbage object to the original location.

When the garbage object is moved to the second threshold, the control unit 300 removes the garbage object from the screen (1625), and displays a second screen (1627). Here, disappearance of the garbage object at a region close to the trash bin icon or the screen boundary may be depicted as a fade-out effect. The control unit 300 may activate the second screen as a background in a full-screen format.

When the detected touch event corresponds to a multi-touch gesture at step 1615, referring to FIG. 14, the control unit 300 detects a multi-point move gesture like spread (1633). For example, the user may increase the distance between two touch points on the garbage object. The control unit 300 may detect a spread gesture. Here, instead of multi-point spread, multi-point drag or multi-point flick may be used.

Upon detection of a multi-point move event like spread, the control unit 300 starts to present an animation effect where the first screen is recovered from the garbage object (1635). For example, the control unit 300 may presents an animation effect wherein the garbage object is gradually smoothed out like a sheet of paper and turned back into the first screen. Together with the animation effect, the control unit 300 may also produce a sound effect and/or a haptic effect as feedback.

During animation effect presentation, the control unit 300 checks whether the distance between the two touch points exceeds a third threshold (1637). Here, the third threshold is a reference value for turning the garbage object back into the first screen in response to a multi-point move event like spread. For example, the third threshold may correspond to a case where at least one of the two touch points is within 1.5 cm from the screen boundary. The third threshold may be set according to the screen size of the touchscreen display and may be changed according to environment settings.

When the distance between the two touch points is not greater than the third threshold, the control unit 300 returns to step 1625 and continues to present the animation effect.

When the distance between the two touch points is greater than the third threshold, the control unit 300 turns the garbage object back into the first screen and displays the first screen (1639).

FIG. 15 is screen representations for user interactions to produce visual effects on a touchscreen display according to exemplary embodiments.

FIG. 15 illustrates visual effects indicative of the appearance, behavior, sound, and/or feel of physical paper when the animation option is set to "tearing". Different tearing effects are presented according to the location and direction of touch events.

In FIG. 15, an application screen is displayed on the display unit 110 as indicated by reference numeral 1501; a multi-touch gesture is made by the user on the application screen as indicated by reference numeral 1503, 1507 or 1509; and the application screen is turned into a garbage object in the form of torn pieces as indicated by reference numeral 1511. Here, movement of the multi-touch gesture may initiate an animation effect where some portion of the application screen is torn first and the application screen is finally turned into a garbage object in the form of torn pieces.

As indicated by reference numeral 1503, a tearing effect may be initiated by a multi-point move gesture whose two touch points are moved (dragged or flicked) in the same direction. Here, the torn portion in the application screen may be determined by the touched locations and movement direction. For example, when the multi-point gesture is moved in an up-to-down direction, the application screen may start to be torn from the top in a downward direction at a portion near to the left of the touch points (a proximity threshold may be predefined). When the multi-point gesture is moved in a left-to-right direction, the application screen may start to be torn from the left in a left-to-right direction at a portion near and above the touch points (a proximity threshold may be predefined). This visual effect may be indicative of tearing a physical piece of paper.

As indicated by reference numeral 1507, a tearing effect may be initiated by a multi-point move gesture whose one of two touch points is fixed and the other is moved (dragged or flicked) in a direction. Here, the torn portion in the application screen may be determined by the touched locations and movement direction. For example, among the two touch points, when a first touch point is fixed at a location and a second touch point is moved in an up-to-down direction, the application screen may start to be torn from the top in a downward direction with reference to the first touch point. This visual effect may be indicative of tearing a physical piece of paper with a ruler.

As indicated by reference numeral 1509, a tearing effect may be initiated by a multi-point move gesture whose two touch points are moved (dragged or flicked) in different directions. Here, the torn portion in the application screen may be determined by the touched locations and movement directions. For example, among the two touch points on the upper portion of the application screen, when a first touch point is moved in a down-to-up direction and a second touch point is moved in an up-to-down direction, the application screen may start to be torn from the top in a downward direction between the two touch points. This visual effect may be indicative of tearing a physical piece of paper in opposite directions.

Exemplary embodiments described above may be realized in connection with a cloud system. For example, the touchscreen display may sense single-point or multi-point touch events and send the sensed touch events to a cloud server. The cloud server may produce animation effects in response to the touch events from the touchscreen display and send the animation effect data to the touchscreen display. The touchscreen display may output the animation effect data on the screen. Here, the touchscreen display and the cloud server may send and receive data in a streaming mode.

The method for providing visual effects on a touchscreen display may be implemented as computer programs and may be stored in various computer readable storage media. The computer readable storage media may store program instructions, data files, data structures and combinations thereof. The program instructions may include instructions specifically developed to realize one or more exemplary embodiments or existing general-purpose instructions known to persons skilled in the art. The computer readable storage media may be hardware devices specially designed to store and execute program instructions, and may include magnetic media such as a hard disk, floppy disk and magnetic tape, optical media such as a CD-ROM and DVD, magneto-optical media such as a floptical disk, and memory devices such as a ROM, RAM and flash memory. The program instructions may include machine codes produced by compilers and high-level language codes executable through interpreters. Each hardware device may be replaced with one or more software modules to perform operations according to aspects of exemplary embodiments, and vice versa.

According to aspects of exemplary embodiments, the touchscreen display may produce visual effects indicative of the appearance, behavior, sound, and/or feel of physical paper. The touchscreen display may provide a more natural user interface having a visual metaphor in the course of executing various user functions. For example, crumpling an application screen into a garbage object ready to be deleted or terminated may correspond to crumpling a sheet of paper in reality; and removing the garbage object from the screen may be indicative of throwing away a crumpled paper in a trash can.

In one embodiment, for unlocking, the touchscreen display may produce visual effects where a lock screen is turned into a garbage object ready to be unlocked just like crumpling a sheet of paper and the garbage object is removed from the screen in a manner indicative of throwing away the crumpled paper in a trash can.

Exemplary embodiments may be applied to all types of touchscreen displays and comparable devices. Aspects of exemplary embodiments may contribute to realization of an optimal environment for producing visual effects on a touchscreen display, thereby enhancing convenience, usefulness and competitiveness of the touchscreen display apparatus.

Although exemplary embodiments have been described in detail hereinabove, it should be understood that many variations and modifications will still fall within the spirit and scope of the inventive concept as defined in the appended claims.

What is claimed is:

1. A method of providing visual effects on a touchscreen display, the method comprising:
  displaying a first screen;
  detecting a multi-point touch on the first screen;
  detecting a first touch event based on the multi-point touch;
  turning the first screen into a garbage object in response to the first touch event;
  detecting a multi-point touch on the garbage object; and
  restoring the first screen by turning the garbage object back into the first screen in response to the detecting of the multi-point touch on the garbage object,
  wherein the turning the first screen into the garbage object comprises displaying an animation based on a combination of both a location and direction of the first touch event,
  wherein the animation is displayed to form a shape of one of among a crumpled globe, torn pieces, and a folded miniature based on the combination of both the location and direction of the first touch event, and
  wherein a size and a shape of the crumpled globe, the torn pieces, and the folded miniature are determined based on the combination of both the location and direction of the first touch event.

2. The method of claim 1, further comprising:
  detecting a single-point touch on the garbage object;
  removing the garbage object by moving the garbage object based on the single-point touch,
  wherein the removing the garbage object comprises moving the garbage object in one of among a preset direction, a direction of the single-point touch, and a direction toward the trash bin icon.

3. The method of claim 2, wherein the removing the garbage object comprises moving the garbage object to the trash bin icon in response to detection of the single-point touch.

4. The method of claim 2, further comprising detecting a touch event based on the single-point touch,
  wherein the removing the garbage object comprises moving the garbage object to the trash bin icon in response to detection of the touch event.

5. The method of claim 2, wherein the removing the garbage object comprises:
  determining a movement direction of the garbage object upon detection of the touch event based on the single-point touch; and
  moving the garbage object in the determined direction.

6. The method of claim 1, further comprising detecting a second touch event based on the multi-point touch on the garbage object.

7. The method of claim 6, wherein restoring the first screen comprises:
   restoring the first screen in response to a determination that the second touch event reaches a preset threshold; and
   restoring the first screen from the garbage object according to changes in location the multi-point touch of the second touch event.

8. The method of claim 1, wherein turning the first screen into a garbage object comprises modifying the first screen in accordance with movement of the first touch event, and turning the modified first screen into the garbage object in response to the first touch event.

9. The method of claim 1, wherein turning the first screen into a garbage object comprises:
   turning the first screen into the garbage object in response to a determination that the first touch event reaches a preset threshold; and
   turning the first screen into the garbage object at a speed determined according to changes in location of the multi-point touch.

10. The method of claim 1, further comprising displaying a second screen as a background along with modification of the first screen according to the first touch event.

11. The method of claim 10, wherein, in the presence of the garbage object, user input on the second screen is ignored as invalid input and user input only on the garbage object is processed as valid input.

12. The method of claim 1, further comprising displaying an animation effect.

13. The method of claim 12, wherein displaying an animation effect further comprises presenting at least one of among a sound effect and a haptic effect as feedback.

14. A method of providing visual effects on a touchscreen display, the method comprising:
   displaying a lock screen;
   detecting a first touch event based on a multi-point touch on the lock screen;
   turning the lock screen into a garbage object in response to the first touch event;
   detecting a second touch event based on a single-point touch on the garbage object; and
   unlocking the screen by moving the garbage object in a preset direction in response to the second touch event,
   wherein the turning the lock screen into the garbage object comprises displaying an animation based on a combination of both a location and direction of the first touch event,
   wherein the animation is displayed to form a shape of one of among a crumpled globe, torn pieces, and a folded miniature based on the combination of both the location and direction of the first touch event, and
   wherein a size and a shape of the crumpled globe, the torn pieces, and the folded miniature are determined based on the combination of both the location and direction of the first touch event.

15. The method of claim 14, wherein the detecting a first touch event comprises:
   detecting the first touch event comprising a multi-point touch in the lock screen and movement of the multi-point touch; and
   removing the lock screen in response to the first touch event.

16. A display apparatus comprising:
   a touchscreen display which detects a first touch event based on a multi-point touch on a first screen and a second touch event based on a multi-point touch on a garbage object and a third touch event based on a single-point touch on the garbage object and displays visual effects according to the touch events;
   a storage unit storing setting information specifying the visual effects according to touch events; and
   a control unit which controls the touchscreen display to display an animation wherein the first screen is turned into the garbage object according to the setting information in response to the first touch event, the garbage object is turned into the first screen according to the setting information in response to the second touch event, the garbage object is moved in response to the third touch event, and a second screen is displayed,
   wherein the control unit displays the animation of turning the first screen into the garbage object based on a combination of both a location and direction of the first touch event,
   wherein the animation is displayed to form a shape of one of among a crumpled globe, torn pieces, and a folded miniature based on the combination of both the location and direction of the first touch event, and
   wherein a size and a shape of the crumpled globe, the torn pieces, and the folded miniature are determined based on the combination of both the location and direction of the first touch event.

17. The display of claim 16, wherein:
   the control unit determines a direction of the third touch event, and controls the touchscreen display to display an animation wherein the garbage object is moved in the direction of the third touch event at a constant velocity.

18. The display of claim 16, wherein the control unit controls the touchscreen display to display an animation wherein the garbage object is moved in one of among a direction toward the trash bin icon, a direction of the third touch event, and a preset direction.

19. The display of claim 16, wherein the control unit controls the touchscreen display to display an animation wherein the first screen is turned into the garbage object in response to a determination that the first touch event reaches a preset first threshold, and controls the touchscreen display to display an animation wherein the garbage object is removed from the screen in response to a determination that the third touch event reaches a preset second threshold.

20. The display of claim 16, wherein the control unit determines the speed of turning the first screen into the garbage object according to changes in location of the multi-point touch associated with the first touch event.

21. A non-transitory computer readable storage medium storing program instructions comprising:
   a function which turns a first screen into a garbage object in response to detection of a first touch event based on a multi-point touch on the first screen;
   a function which turns the garbage object into the first screen in response to detection of a second touch event based on a multi-point touch on the garbage object;
   a function which moves the garbage object upon detection of a third touch event based on a single-point touch on the garbage object; and
   a function which transitions to a second screen,
   wherein the turning the first screen into the garbage object comprises displaying an animation based on a combination of both a location and direction of the first touch event, wherein the animation is displayed to form a shape of one of among a crumpled globe, torn pieces, and a folded miniature based on the combination of both the location and direction of the first touch event, and wherein a size and a shape of the crumpled globe, the torn pieces, and the folded miniature are determined based on the combination of both the location and direction of the first touch event.

22. A method for providing visual effects on a touchscreen display, the method comprising:

displaying a first user interface screen containing a virtual keypad;

detecting a touch event on the first user interface screen;

displaying information corresponding to a first touch event in response to the first touch event based on a single-point touch on the virtual keypad;

displaying a transition from the first user interface screen to a second user interface screen in response to a second touch event based on a multi-point touch on the first user interface screen, the second user interface screen comprising a garbage object;

detecting a multi-point touch on the garbage object; and restoring the first user interface screen by turning the garbage object back into the first user interface screen in response to the detecting of the multi-point touch on the garbage object, wherein the transition from the first user interface screen to the second user interface screen comprises displaying an animation based on a combination of both a location and direction of the first touch event, wherein the animation is displayed to form a shape of one of among a crumpled globe, torn pieces, and a folded miniature based on the combination of both the location and direction of the first touch event, and wherein a size and a shape of the crumpled globe, the torn pieces, and the folded miniature are determined based on the combination of both the location and direction of the first touch event.

23. A graphical user interface for a computing device comprising a touchscreen display, the graphical user interface comprising:

a first screen;

a first animation transitioning the first screen into a garbage object in response to a first user touch input;

a second animation transitioning the garbage object into the first screen in response to a second user touch input;

a third animation moving the garbage object in response to a third user touch input, wherein the first animation determines an animation based on a combination of both a location and direction of the first touch event, wherein the animation is displayed to form a shape of one of among a crumpled globe, torn pieces, and a folded miniature based on the combination of both the location and direction of the first touch event, and wherein a size and a shape of the crumpled globe, the torn pieces, and the folded miniature are determined based on the combination both the location and direction of the first touch event.

24. The graphical user interface of claim 23, wherein the first screen is deleted and the third animation comprises the garbage object being removed in response to a determination that the third user touch input is a predetermined single-touch input.

25. The graphical user interface of claim 23, wherein the first screen is restored and the second animation comprises the garbage object being transitioning to the first screen in response to a determination that the second user touch input is a predetermined multi-touch input.

* * * * *